United States Patent [19]
Stuckman et al.

[11] Patent Number: 5,701,395
[45] Date of Patent: Dec. 23, 1997

[54] METHOD OF PROGRAMMING A POLYNOMIAL PROCESSOR

[75] Inventors: Bruce Edward Stuckman, Algonquin; David Alan Hayner, Arlington Heights, both of Ill.

[73] Assignee: Motorola, Inc., Schaumburg, Ill.

[21] Appl. No.: 358,278

[22] Filed: Dec. 19, 1994

[51] Int. Cl.⁶ .................. G06F 15/18; G06E 1/00
[52] U.S. Cl. .................. 395/20; 395/11; 395/23
[58] Field of Search .................. 395/20–25, 27; 382/155–159

[56] References Cited

U.S. PATENT DOCUMENTS

| | | | |
|---|---|---|---|
| 4,544,230 | 10/1985 | Caulfield | 350/96.14 |
| 4,603,398 | 7/1986 | Bocker et al. | 364/845 |
| 5,287,431 | 2/1994 | Takatori | 395/25 |
| 5,408,588 | 4/1995 | Ulug | 395/23 |
| 5,550,732 | 8/1996 | Wang et al. | 364/148 |

OTHER PUBLICATIONS

Regressions by Leaps and Bounds by George M. Furnival and Robert W. Wilson, Jr., Technometrics©, vol. 16, No. 4, pp. 499–511, Nov. 1974.

Application of the Leaps and Bounds Algorithm to Nonlinear System Modeling by Norman W. Laursen and Bruce E. Stuckman, presented at ComCon 88 Advances in Communications and Control Systems, Baton Rouge, Louisiana, Oct. 19–21, 1988.

Primary Examiner—Tariq R. Hafiz
Attorney, Agent, or Firm—Bruce E. Stuckman; Michael K. Lindsey

[57] ABSTRACT

In a polynomial processor a plurality of training data are received which express the desired relationship between the processor's output and input. The terms of a polynomial function are determined using a regression subsets method on the training data. The coefficient for each term is determined and the polynomial processor is programmed by loading the terms and coefficients into the processor.

14 Claims, 4 Drawing Sheets

METHOD OF PROGRAMMING A POLYNOMIAL PROCESSOR

RELATED INVENTIONS

The present invention is related to the following inventions which are assigned to the same assignee as the present invention:

(1) "Artificial Neuron and Method of Using Same", having Ser. No. 08/076,602, filed Jun. 14, 1993.

(2) "Controller for Nonlinear Systems and Method for Use Thereof", filed currently herewith.

(3) "Polynomial Controller for Nonlinear Systems and Method for Use Thereof", filed currently herewith.

The subject matter of the above-identified related inventions is hereby incorporated by reference into the disclosure of this invention.

TECHNICAL FIELD

The present invention relates generally to general purpose processors and, in particular, to polynomial processors.

BACKGROUND OF THE INVENTION

Polynomial processors, such as the devices described in Related Invention (1), have wide application. These processors are general purpose devices which produce an output signal which is a polynomial function of n input signals. In particular, the processor includes a plurality of computing elements that each calculate a term in the polynomial function for each computational cycle. The output signal is generated by accumulating the outputs of each of the computational elements, thereby forming an output signal which implements the polynomial function. The processor is programmed by determining the terms in the polynomial function and the corresponding coefficients and by loading these terms and coefficients into the polynomial processor.

In the use of the polynomial processor, one may wish to implement a polynomial function whose order is k. The implementation of a general polynomial of this form requires m terms where m is given by $m=(n+k)!/n!k!$, where k, m, and n are integers and n represents the number of processor inputs.

If the polynomial processor has r' computing elements, where r' is a positive integer, and each of the elements calculates a single polynomial term, not all of the m terms of the general polynomial can be implemented. Thus, a set or r' terms must be selected from the m terms. There are $m!/r'! (m-r')!$ candidate possible sets of r' terms. Evaluating each possible set of r' terms individually would be intrinsically difficult for all but the smallest of problems. A need exists for an efficient method for selecting the r' terms to be included in the polynomial function of a polynomial processor.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

In summary, the present invention is a method for choosing the specific r' polynomial terms to be implemented by a polynomial processor. The specific r' terms are selected from the m terms of a general polynomial, where $r' \leq m$.

Figure 1:
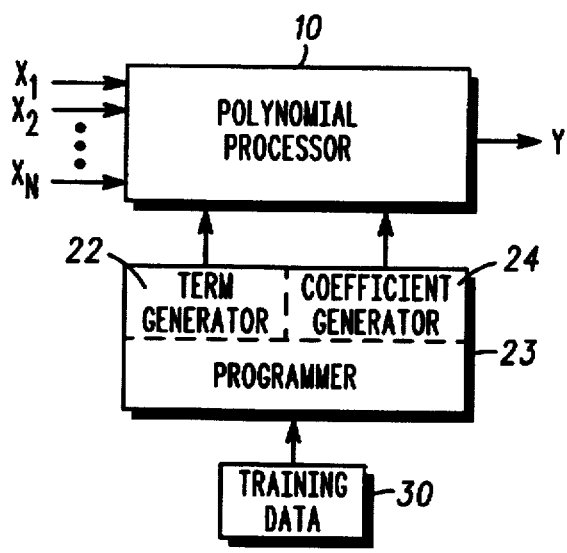
FIG. 1 shows a block diagram representation in accordance with one embodiment of the present invention.

FIG. 1 shows a block diagram representation in accordance with one embodiment of the present invention. Polynomial processor 10 is responsive to processor input in the form of signals $x_1, x_2, \ldots, x_n$. Processor output, a signal y, is a polynomial function of the processor input. Thus, the processor output can be represented as follows:

$$y = \sum_{i=1}^{r'} w_{i-1} x_1^{g_{0i}} x_2^{g_{1i}} \ldots x_n^{g_{ni}} \tag{1}$$

where r' is the number of terms in the polynomial function, $w_{i-1}$ is the coefficient of the ith term of the polynomial function, and $g_{0i}, g_{1i}, \ldots, g_{ni}$ represent the exponential powers of the inputs in the ith term. The method of programming the polynomial processor 10 becomes the method of determining the r' terms to include in the polynomial function and their corresponding coefficients.

Thus, programmer 20 includes a term generator 22 and a coefficient generator 24 which use training data 30 to program polynomial processor 10 in accordance with the various methods described herein.

Figure 2:
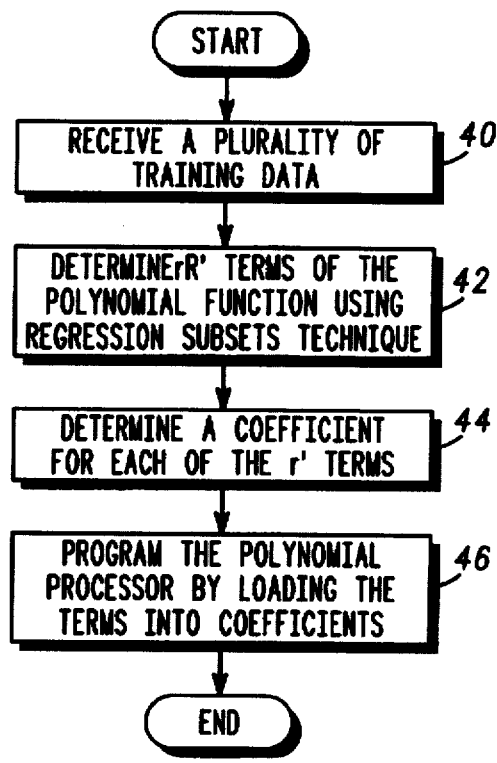
FIG. 2 presents a flowchart representation of a method in accordance with one embodiment of the present invention.

FIG. 2 presents a flowchart representation of a method in accordance with one embodiment of the present invention. The method begins by receiving a plurality of training data as shown in step 40. This training data expresses the desired relationship between the processor output and the processor input or inputs. The method continues, as shown in step 42, by determining the particular r' terms of the possible terms to be included in the polynomial function using a regression subsets technique. Once the terms in the polynomial function have been determined, the coefficient of each term is found as shown in step 44. Computing a coefficient for each of the r' coefficients. While step 44 is shown as separate from step 42, one of ordinary skill in the art will recognize that the determination of the coefficients of the r' terms could be performed in conjunction with the regression subsets method of step 42.

Regarding step 46, the polynomial processor is programmed by loading the terms and coefficients. In a preferred embodiment of the present invention, the terms of the polynomial function are loaded by loading the exponents for each of the inputs for each term. For example, if the polynomial processor had three inputs $x_1$, $x_2$, and $x_3$, and if the first term was $x_2^2 x_3$, this term could be loaded by loading (0,2,1), respectively, the exponents of the first, second and third inputs. Depending on the structure of the polynomial processor, the loading of the terms of the polynomial function could be performed in numerous other ways as will be recognized by those skilled in the art.

Any number of regression subsets techniques can be used to implement step 42, however, in a preferred embodiment of the present invention, the regression subsets techniques is chosen from the group consisting of: a backward elimination method, a forward selection method, a stepwise selection method, and an optimal regression subsets method. Each of these techniques will be described in further detail in the description which follows.

A backward elimination method begins with the full m-terms of a general kth order polynomial. The r'-term polynomial function is found by incrementally decreasing the number of terms in the polynomial from m to r' by the following rule. At each step the consequences of removing each term by itself are considered by calculating the resulting error between the training data and the polynomial function based upon an error criteria such as sum-squared error. The term that, when removed, increases the error the least, is removed from the polynomial function. This process is iteratively continued until only r' terms are in the polynomial function.

A forward selection method begins with no terms. The r'-term polynomial function is found by incrementally increasing the number of the terms from 1 to r' by the following rule. At each step, the consequences of adding each term by itself are considered by calculating the resulting error between the training I/O data and the polynomial function based upon an error criteria such as sum-squared error. The term that, when added, decreases the error the most, is added to the polynomial function. This process is iteratively continued until r' terms are in the polynomial function.

A stepwise selection method uses a combination of forward selection and backward elimination methods to determine an r'-term trial polynomial. An initial r'-term polynomial is selected using another regression subsets technique such as backward elimination or forward selection. The r'term polynomial is refined by alternatively performing forward selection and backward elimination to selectively add and remove terms to the polynomial. If the same term or terms are being iteratively added and removed, then the method ends.

Optimal regression subsets methods guarantee that the r'-term polynomial function which is generated provides the minimum error between the training data and the polynomial function, based upon a performance index such as sum-squared error. One such optimal regression subsets techniques is an exhaustive approach which forms and compares all r'-term subsets to determine the subset with the minimum error. A less computationally intensive approach is presented by Furnival & Wilson in "Regression by Leaps and Bounds," *Technometrics*, Vol. 16, No. 4, November 1974, hereby incorporated by reference. This leaps and bounds methodology allows the optimum r'-term polynomial to be found based on an evaluation of less than all of the r'-term subsets.

Figure 3:
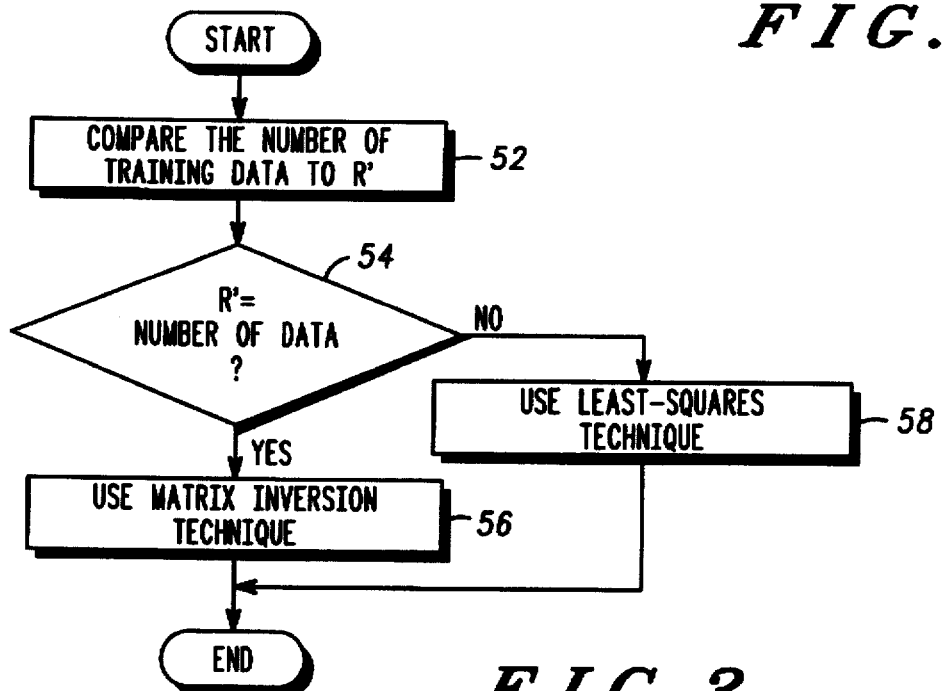
FIG. 3 shows flowchart representation of a method for determining a coefficient for each term in the polynomial function in accordance with a preferred embodiment of the present invention.

FIG. 3 shows flowchart representation of a method for determining a coefficient for each term in the polynomial function in accordance with a preferred embodiment of the present invention. First, regarding step 52, the number of training data values is compared with the number of terms, r', in the polynomial function. Regarding decision step 54, if the number of training data values equal the number of polynomial terms, the procedure goes to step 56 which indicates that a matrix inversion technique is used to solve for the value of each coefficient. If, on the other hand, the number of training data values is not equal to the number of coefficients, the procedure goes to step 58, which indicates that a least squares estimation technique is used to solve for the value of each coefficient.

While a preferred embodiment is described herein, one with ordinary skill-in-the-art will recognize that other curve fitting techniques, for example, extended least squares, pseudo-inverse, Kalman filtering, maximum likelihood, Bayesian estimation, polynomial splines, and like techniques, could be used to fit the system polynomial to the training data.

Figure 4:
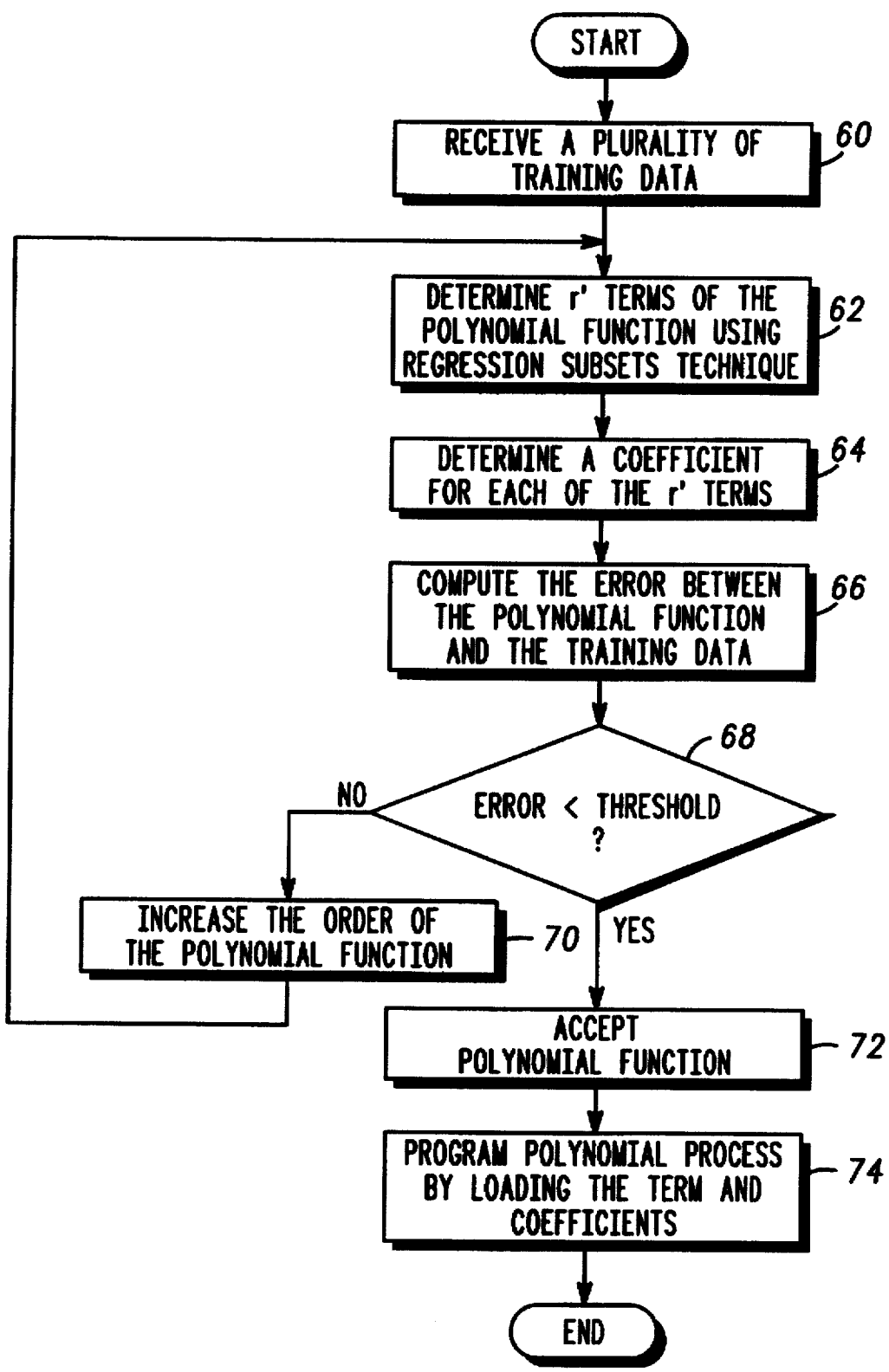
FIG. 4 presents a flowchart representation of a method in accordance with an alternative embodiment of the present invention.

FIG. 4 presents a flowchart representation of a method in accordance with an alternative embodiment of the present invention. In this method, the resulting polynomial is checked to determine if it produces an acceptable level of error. If not, the order of the polynomial function is iteratively increased to provide further accuracy.

The method begins by receiving a plurality of training data in step 60. The r' terms of the polynomial function are determined in step 62 using a regression subsets technique. A coefficient for each term is determined as shown in step 64. This results in r' coefficients being generated. Regarding box 66, the error between the resulting polynomial function and the training data is calculated based upon an error criterion such as sum-squared error. The computed error is compared with an error threshold as shown in decision box 68. If the error is not less than the error threshold, the order of the polynomial function is increased as show in step 70 and the method proceeds back to step 62. If however, the error is less than the error threshold, the polynomial function is accepted as shown in step 72 and the polynomial processor is programmed as shown in step 74.

Figure 5:
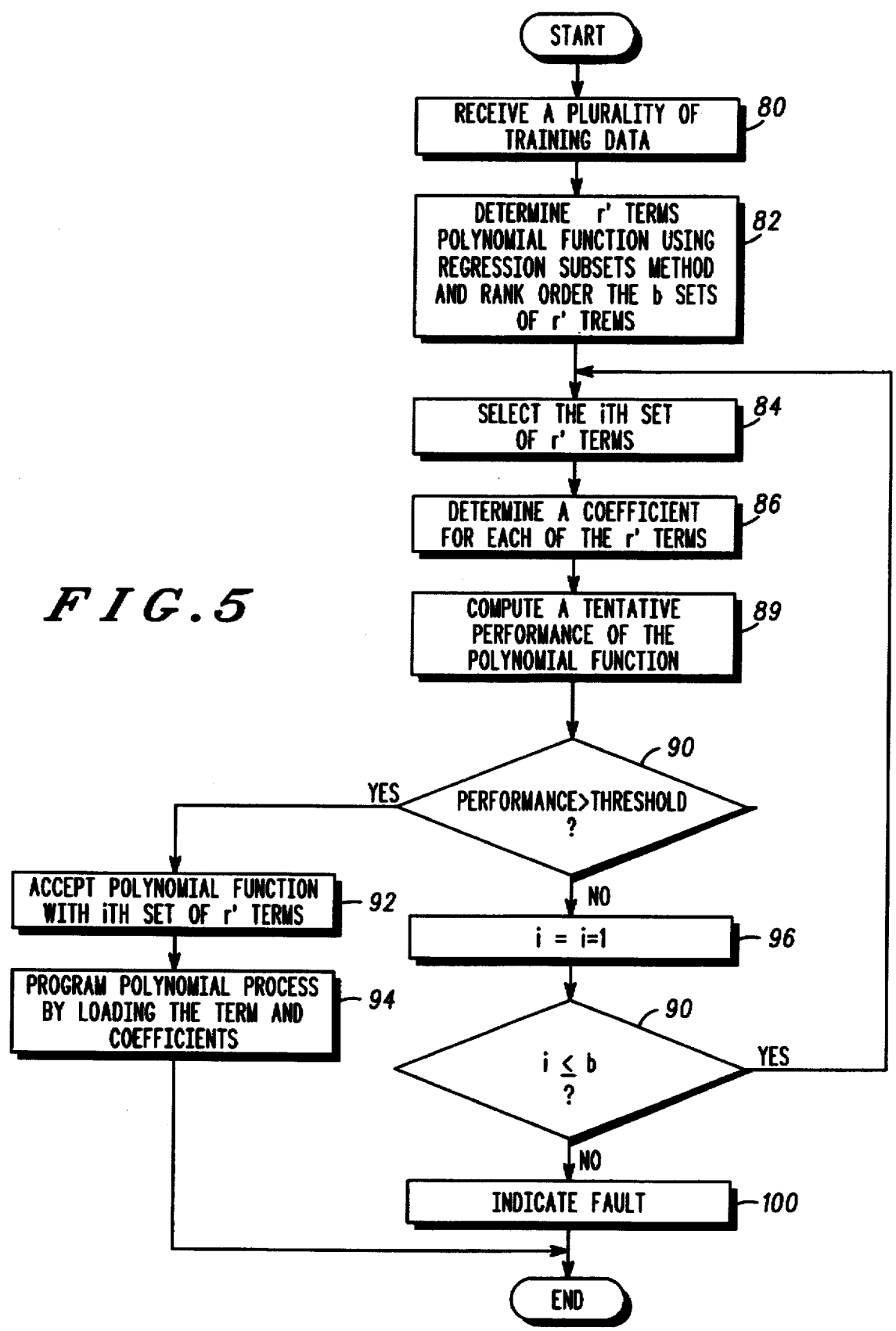
FIG. 5 presents an flowchart representation of a method in accordance with an additional embodiment of the present invention.

FIG. 5 presents an flowchart representation of a method in accordance with an additional embodiment of the present invention. This embodiment allows a polynomial function to be evaluated based upon a performance criteria which may be more meaningful that sum-squared-error or the like.

In step 80, a plurality of training data are received. Regarding step 82, the terms for b different r'-term polynomial functions are determined using a regression subsets method. These r'-term polynomials are rank-ordered from 1 to b (best to worst). The ith set of r' terms are selected as shown in step 84. Initially, the first set of r' terms are used. A coefficient is found for each term as shown in step 86, whereby producing r' coefficients.

The tentative performance of the polynomial function is computed as shown in step 88. This tentative performance may be based upon factors in place of or in addition to the error criteria used in the regression subsets method. Examples of such performance criteria include initial and terminal error, maximum error over all data points, and median error. In addition, the application of the polynomial processor to special classes of problems, such as control problems, could produce class-specific performance criteria. For example, a control polynomial could be run in a simulated environment to produce a performance based upon time domain-related factors such as: steady-state error, rise time, percent overshoot, undershoot; frequency domain factors such as bandwidth and crossover or other factors such as robustness and stability via gain and phase margins, singular values, etc.

The resulting performance is compared with an performance threshold as shown in step 90. If the performance is greater than the threshold, the polynomial function is accepted with the ith set of r' terms and the corresponding r' coefficients as shown in step 92. These terms and coefficients are programmed into the polynomial processor as shown in step 94.

If however, the performance is not greater than the performance threshold, the value of i is increased in step 96 and compared with b in step 98. The method proceeds to step 84 to evaluate the next set of r' terms unless all b of the sets have been tried, in which case a fault is indicated as shown in step 100.

Figure 6:
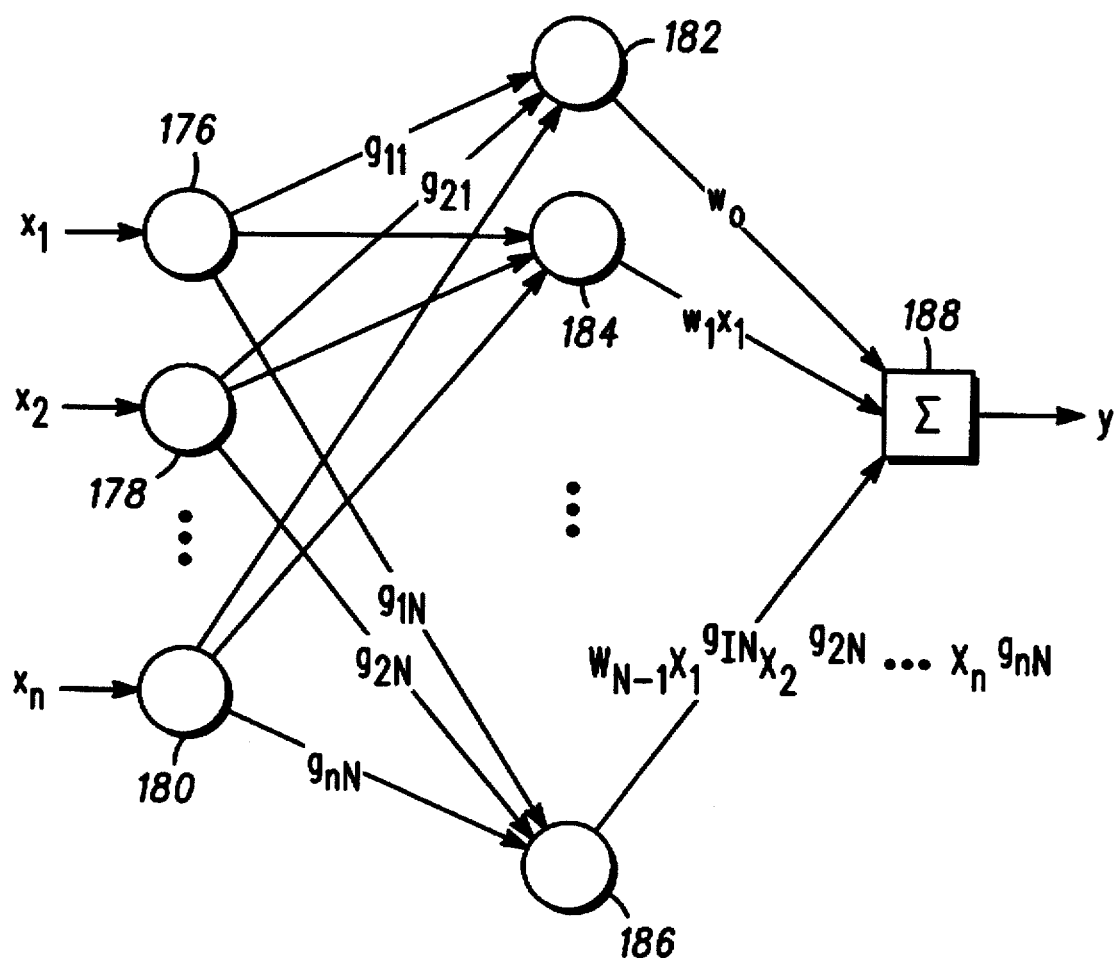
FIG. 6 shows a schematic representation of the processor used in a preferred embodiment of the present invention.

FIG. 6 shows a schematic representation of the processor used in a preferred embodiment of the present invention. This polynomial processor 10 calculates processor output signals as a polynomial function of one or more processor input signals. At least one processor input signal, $x_1, x_2, \ldots, x_n$ is fed to input nodes 176, 178, . . . 180 of an input layer.

The output of each input node 176, 178, . . . 180 in the input layer is distributed at least one processing element of a hidden layer (of which only processing elements 182, 184, 186 are shown). Each processing element applies a gating function to each of the control inputs to produce a corresponding gated input. Any given processing element may apply a different gating function to each different control input it receives. For example, processing element 182 applies a gating function (g11) to the processor input it receives from input node 176; it applies a gating function (g21) to the processor input it receives from input node 78; and so forth. The gated inputs are multiplied together by a multiplier in the processing element to form a product, which is then multiplied by a coefficient $w_{i-1}$ to form the ith term of the polynomial. The ith term of the polynomial is added to the other, similarly calculated, terms by summer 188 to produce the processor output y.

For example, in FIG. 6 processing element 182, which happens to be responsible for generating the first polynomial term, multiplies its gated inputs together to form a product (which happens to be one because in this case the gating functions g11, g21, . . . $g_{n1}$ are all 0), which is multiplied by a coefficient $w_o$ to produce a corresponding output $w_o$. Processing element 184, which happens to be responsible for generating the $w_1 x_1$ term of the polynomial, multiplies its gated inputs together to form a product (which happens to be $x_1$ because in this case the gated functions are all 0 except for the gating function that is applied to the $x_1$ output of the input node 176), which is multiplied by a coefficient $w_1$ to produce a corresponding output $x_1 w_1$. In like fashion, processing element 186 produces an output $w_{n-1} x_1$ to the power of $g_{1n}$, $x_2$ to the power of $g_{2n}$, . . . , $x_n$ to the power of $g_{nN}$. The outputs of processing elements 182, 184, . . . 186 are summed together by a suitable summing means or function, such as summer 188, in an output layer to produce the processor output signal y in accordance with Equation (1).

While specific embodiments of the present invention have been shown and described, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method for programming a polynomial processor having at least one processor input and a processor output, the polynomial processor calculating the processor output as a polynomial function of the at least one processor input, the method comprising the following steps:

receiving a plurality of training data, the training data expressing a desired relationship between the processor output and the at least one processor input;

determining r' terms of the polynomial function using a regression subsets technique on the plurality of training data;

determining r' coefficients of the r' terms; and loading the r' terms and the r' coefficients into the polynomial processor.

2. The method of claim 1 wherein the polynomial processor includes r' computing elements.

3. The method of claim 2 wherein the r' computing elements each calculate one of the r' terms of the polynomial function.

4. The method of claim 1 wherein the regression subsets technique is chosen from the group consisting of: a backward elimination method; a forward selection method; a stepwise selection method; and an optimal regression subsets method.

5. The method of claim 1 wherein the step of determining r' coefficients of the r'terms includes determining the r' coefficients using a least-squares technique on the plurality of training data.

6. The method of claim 1 wherein the step of determining r' coefficients of the r' terms includes determining the r' coefficients using a matrix inversion technique on the plurality of training data.

7. The method of claim 1 further comprising the steps of:

computing an error between the polynomial function and the training data;

comparing the error to an error threshold;

increasing r' and returning to the step of determining r' terms of the polynomial function if the error is not less than the error threshold; and accepting the polynomial function and proceeding to the step of loading if the error is less than the error threshold.

8. A method for programming a polynomial processor having at least one processor input and a processor output, the polynomial processor calculating the processor output as a polynomial function of the at least one processor input, the method comprising the following steps:

receiving a plurality of training data, the training data expressing the desired relationship between the processor output and the at least one processor input;

determining b sets of r' terms for the polynomial function using a regression subsets technique on the plurality of training data;

rank-ordering the b sets of r' terms;

selecting i=1;

selecting an ith set of r' terms;

determining r' coefficients of the r' terms; and loading the r' terms and the r' coefficients into the polynomial processor.

9. The method of claim 8 wherein the polynomial processor includes r' computing elements.

10. The method of claim 9 wherein the r' computing elements each calculate one of the r' terms of the polynomial function.

11. The method of claim 8 wherein the regression subsets technique is chosen from the group consisting of: a backward elimination method; a forward selection method; a stepwise selection method; and an optimal regression subsets method.

12. The method of claim 8 wherein the step of determining r' coefficients of the r' terms includes determining the r' coefficients using a least-squares technique on the plurality of training data.

13. The method of claim 8 wherein the step of determining r' coefficients of the r' terms includes determining the r' coefficients using a matrix inversion technique on the plurality of training data.

14. The method of claim 8 further comprising the steps of:

computing a tentative performance of the polynomial function;

comparing the tentative performance to a performance threshold;

increasing i and returning to the step of selecting a ith set of r' terms of the polynomial function if the performance is not greater than the performance threshold and i is less than or equal to b;

increasing i and indicating a fault condition if the performance is not less than the performance threshold and i is not less than or equal to b; and accepting the polynomial function and proceeding to the step of loading if the performance is greater than the performance threshold.

* * * * *